W. HARTER & A. A. STEPHENS.
VEHICLE DOOR FASTENER.
APPLICATION FILED APR. 13, 1914.
1,132,341.
Patented Mar. 16, 1915.
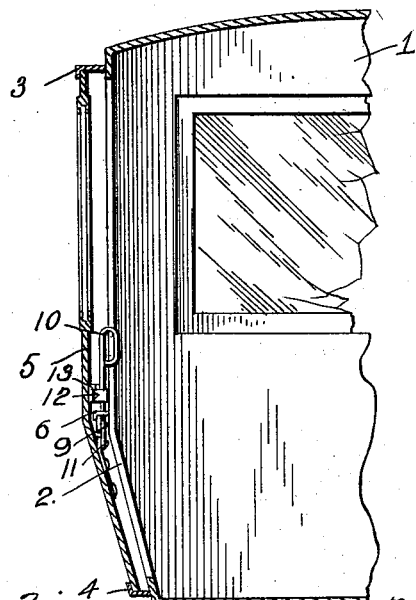
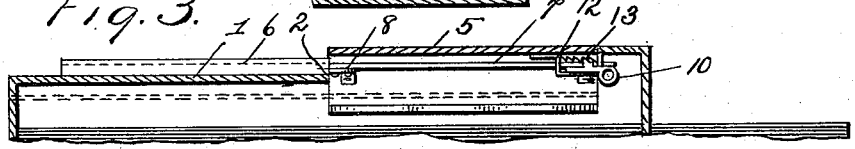
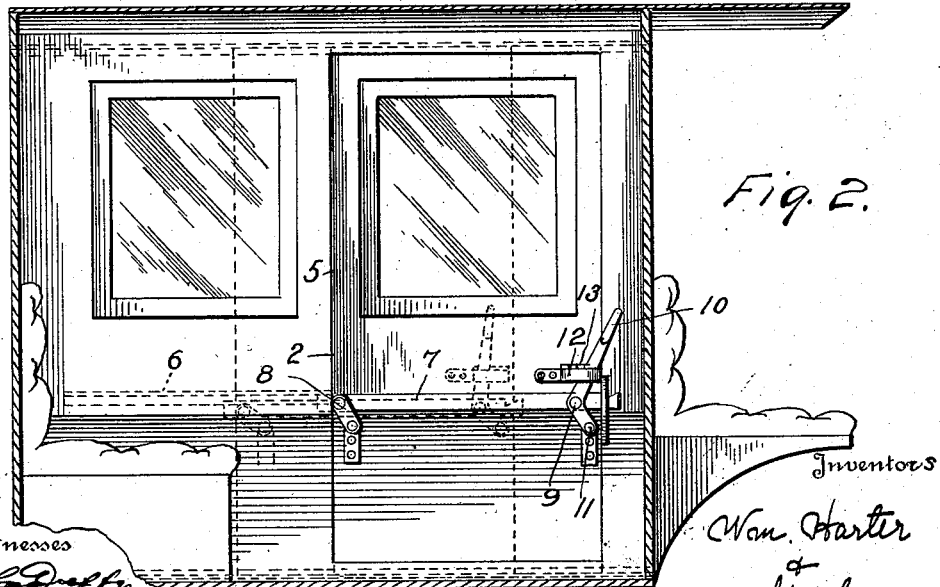

UNITED STATES PATENT OFFICE.

WILLIAM HARTER AND ALVA A. STEPHENS, OF GREENVILLE, OHIO.

VEHICLE DOOR-FASTENER.

1,132,341.  Specification of Letters Patent. Patented Mar. 16, 1915.

Application filed April 13, 1914. Serial No. 831,462.

*To all whom it may concern:*

Be it known that we, WILLIAM HARTER and ALVA A. STEPHENS, citizens of the United States, residing at Greenville, in the county of Darke and State of Ohio, have invented new and useful Improvements in Vehicle Door-Fasteners, of which the following is a specification.

Our present invention pertains to the doors of closed vehicles; and it contemplates the provision of means whereby the door of a vehicle may be expeditiously and easily fixed with respect to the body of the vehicle so as to effectually prevent rattling of the door irrespective of whether the door is open or closed or partly open.

The invention also contemplates the provision of improved means for securing a vehicle door in a closed or an open position, and this without liability of the door being casually released.

With the foregoing in mind the invention will be understood from the following description and claim when the same are read in connection with the drawings, accompanying, and forming part of this specification, in which:

Figure 1 is a transverse section of a vehicle body equipped with our improvements. Fig. 2 is a longitudinal vertical section taken from the inside of the body and showing the controlling lever and the clutch bar of our improved mechanism in full lines and the L-shaped rail in dotted lines. Fig. 3 is a detail horizontal section illustrative of the relative arrangement of the door and its appurtenances relative to the side wall and door opening of the body.

Similar numerals of reference designate corresponding parts in all of the views of the drawings.

With the exceptions hereinafter noted, the body 1 may be of the conventional construction or of any other construction not incompatible with our invention. The said body is provided at 2 with a door opening, and at 3 and 4 with guide rails for a slidable door 5.

In furtherance of our invention, the body is provided on its side and in rear of the door opening 2 with a rail 6, of L-shape in cross-section.

Carried at the inner side of the door 5, is a clutch bar 7 designed as hereinafter described to coöperate with the rail 6. The rear end of the said clutch bar is connected with the inner side of the door by a link 8, and the forward portion of the bar is pivotally connected at 9 with a hand lever 10 that is fulcrumed on the door at the point 11. The said hand lever is arranged between a guard strap 12 on the door and a rack 13 fixed to the door, there being sufficient clearance between the rack and the guard strap to permit of the lever being sprung into and out of engagement with the rack.

In the practical operation of our novel device, it will be manifest that forward movement of the hand lever 10 will be attended by an upward thrust of the clutch bar 7, and when said bar is moved upwardly it will be placed in firm frictional contact with the rail 6. Then when the lever 10 is engaged with the rack 12, the door will not only be secured in the position in which it is placed, but will be effectually prevented from rattling or shaking. This is true no matter whether the door is open or closed or partly open. To release the door from the position in which it is secured, it is simply necessary to spring the lever 10 out of engagement with the rack and then swing the lever rearwardly so as to lower the clutch bar 7. With this done, the door can be moved with the same facility as a door that is not equipped with anti-rattling means.

It will be gathered from the foregoing that notwithstanding the efficiency of our improved device, the same is simple and compact in construction, and when properly embellished is calculated to enhance rather than detract from the finished appearance of a vehicle interior.

Having described our invention, what we claim and desire to secure by Letters-Patent, is:

The combination of a vehicle body having a door opening, exterior guide rails on the body, a door slidable in said guide rails, a rail, of L-shape in cross-section, fixed to and arranged at the outer side of the body and disposed in rear of the door opening, a vertically-movable clutch bar carried at the inner side of the door and connected through a link thereto and arranged to bear upwardly against the underside of the L-shaped rail, a hand lever fulcrumed on the door and connected at an intermediate point of its length to said clutch bar; said hand lever being resilient, a rack fixed to the inner side of the door and constructed and arranged to be engaged by the hand lever, and a guard strap carried by the door and arranged at the opposite side of the hand lever, with reference to the rack.

In testimony whereof we have hereunto set our hands in presence of two subscribing witnesses.

WILLIAM HARTER.
ALVA A. STEPHENS.

Witnesses:
 JAS. B. KOLP,
 W. D. BRUMBAUGH.